United States Patent
Urushizaki et al.

[11] Patent Number: 6,163,011
[45] Date of Patent: Dec. 19, 2000

[54] STRUCTURE OF AND METHOD FOR LASER WELDING METAL MEMBERS AND FUEL INJECTION VALVE

[75] Inventors: Mamoru Urushizaki, Chiryu; Takashi Ogata, Anjo; Yoshinori Ohmi, Kariya; Hideaki Shirai, Okazaki; Yutaka Niwa, Nagoya, all of Japan

[73] Assignee: Denso Corporation, Kariya, Japan

[21] Appl. No.: 09/209,475

[22] Filed: Dec. 11, 1998

[30] Foreign Application Priority Data

Dec. 11, 1997 [JP] Japan ................................. 9-362595
Nov. 16, 1998 [JP] Japan ............................... 10-325285

[51] Int. Cl.[7] .......................... B23K 26/22; F16K 31/02; F02M 51/06
[52] U.S. Cl. ............................ 219/121.64; 251/129.21; 428/594; 428/685
[58] Field of Search ........................ 239/585.1, 585.3, 239/585.4; 251/129.21; 219/121.63, 121.64; 228/262.41; 428/594, 685; 403/271, 272

[56] References Cited

U.S. PATENT DOCUMENTS

| | | |
|---|---|---|
| 4,348,131 | 9/1982 | Shimanuki et al. .................... 403/272 |
| 4,873,416 | 10/1989 | Boder ................................. 219/121.64 |
| 5,178,362 | 1/1993 | Vogt et al. ......................... 251/129.21 |
| 5,236,174 | 8/1993 | Vogt et al. ......................... 251/129.21 |
| 5,263,649 | 11/1993 | Babitzka et al. ..................... 239/585.4 |
| 5,343,014 | 8/1994 | Ogino et al. ....................... 219/121.64 |
| 5,381,965 | 1/1995 | Chabon et al. ....................... 239/585.1 |
| 5,628,449 | 5/1997 | Onuma et al. ..................... 219/121.64 |
| 5,828,032 | 10/1998 | Krzya et al. ...................... 219/121.64 |
| 5,950,932 | 9/1999 | Takeda et al. ..................... 251/129.21 |

*Primary Examiner*—Geoffrey S. Evans
*Attorney, Agent, or Firm*—Pillsbury Madison & Sutro LLP

[57] ABSTRACT

A first member (11) and a second member (12) of metal materials of different kinds are overlapped one upon the other, and the surface of the first member (11) is irradiated with a laser beam to form a melt-solidified portion (2). The melt-solidified portion (2) has a nearly inverted triangular shape in cross section becoming gradually narrow toward the inside from the front surface side of the first member (11), and has a low-hardness layer (21) on the front surface side and a high-hardness layer (22) on the inside. The high-hardness layer (22) has a welded structure in which first layers (23) and second layers (24) having a hardness smaller than that of said first layers (23) are alternatingly laminated in the direction in which the welding proceeds.

15 Claims, 17 Drawing Sheets

(a)   (b)

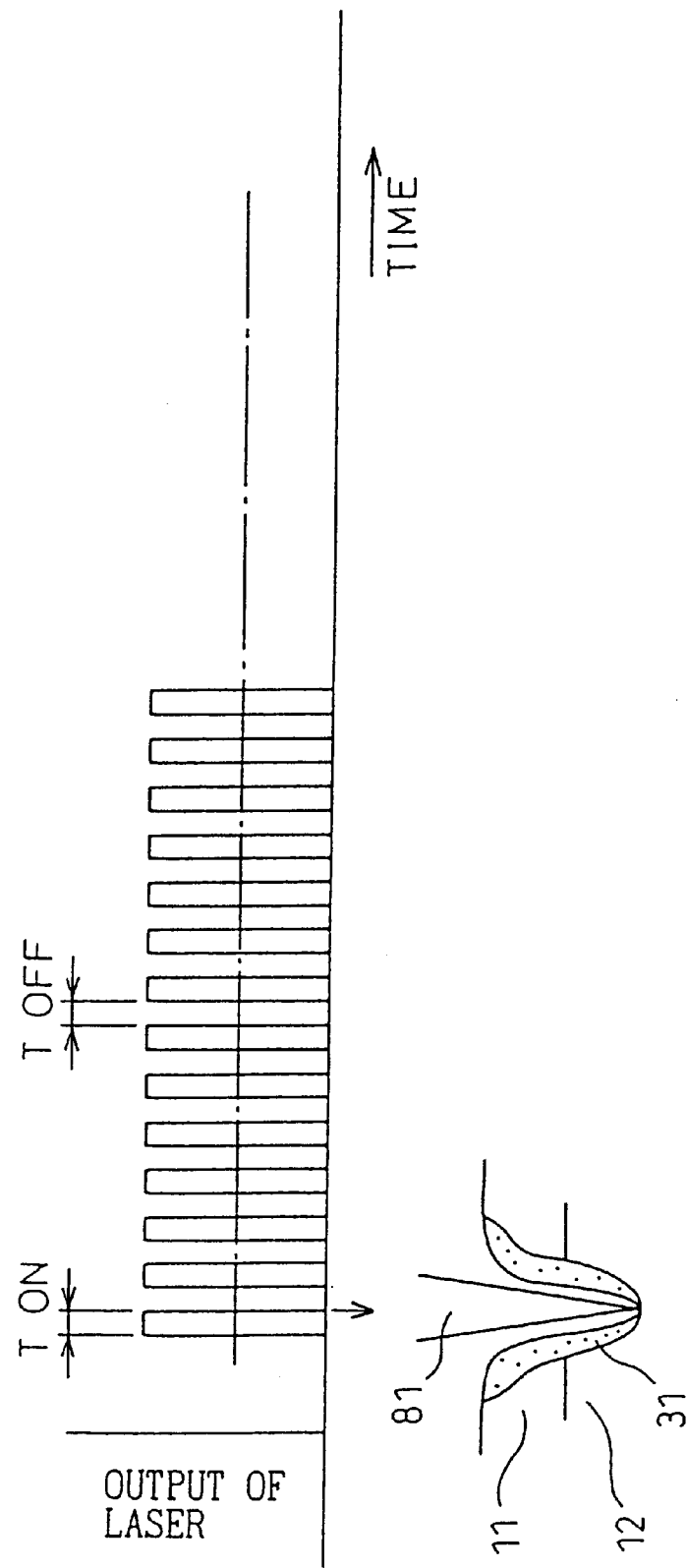

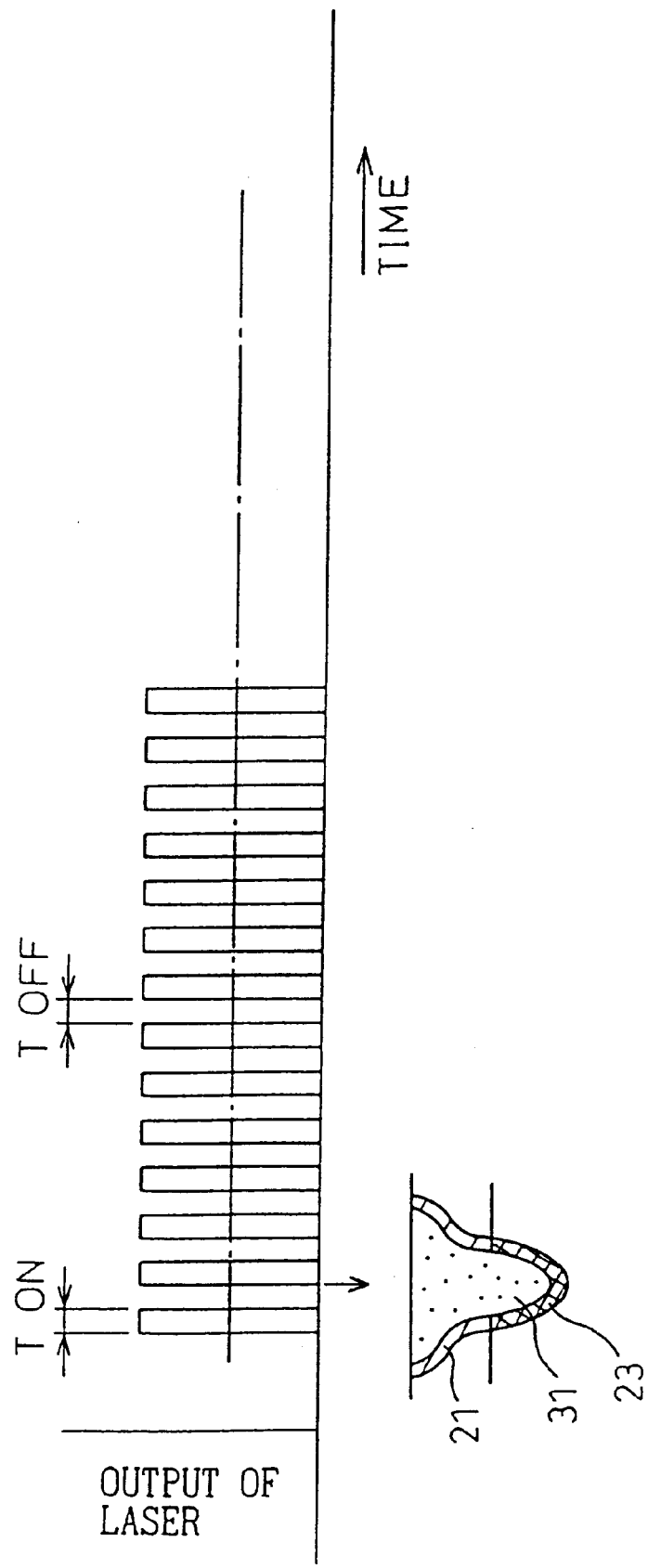

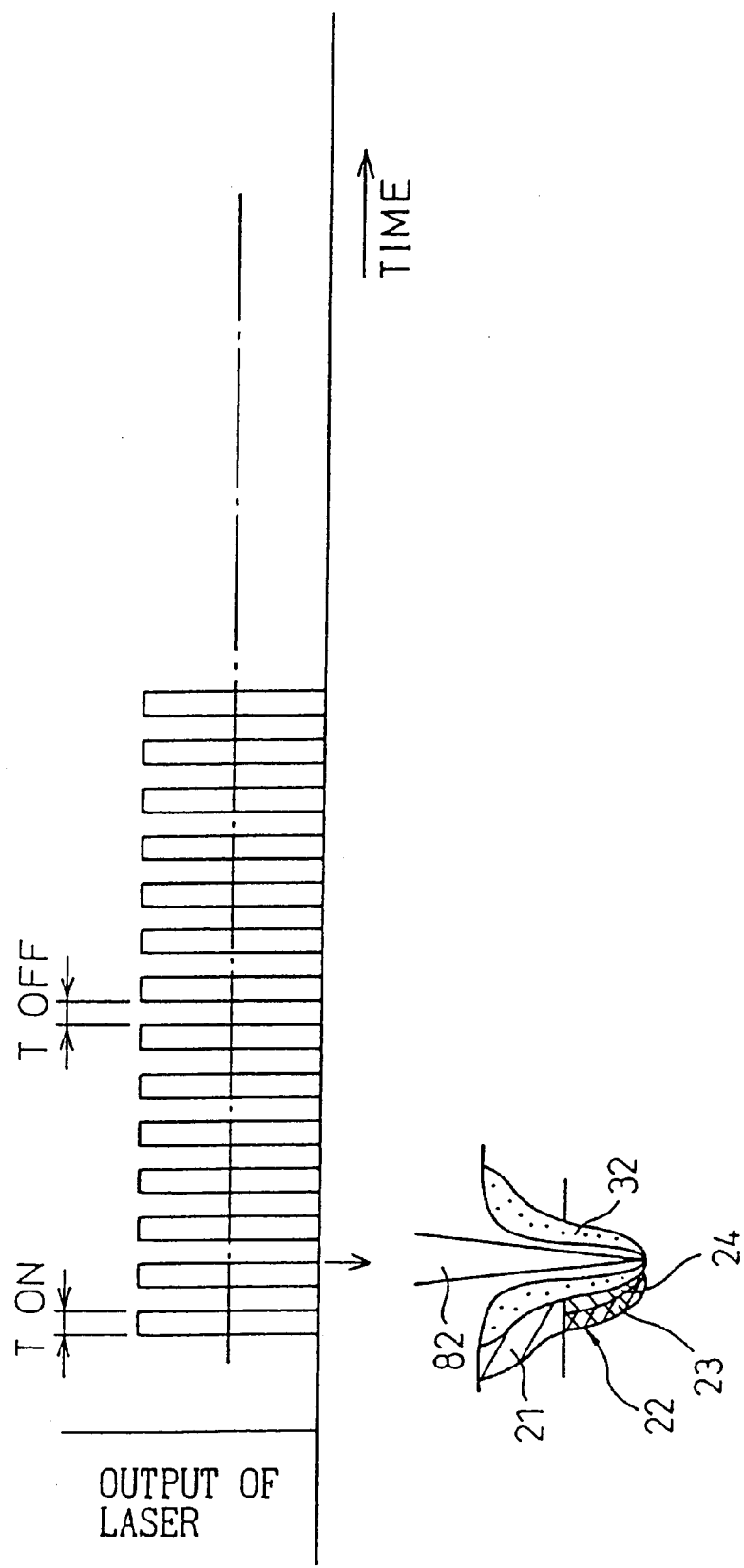

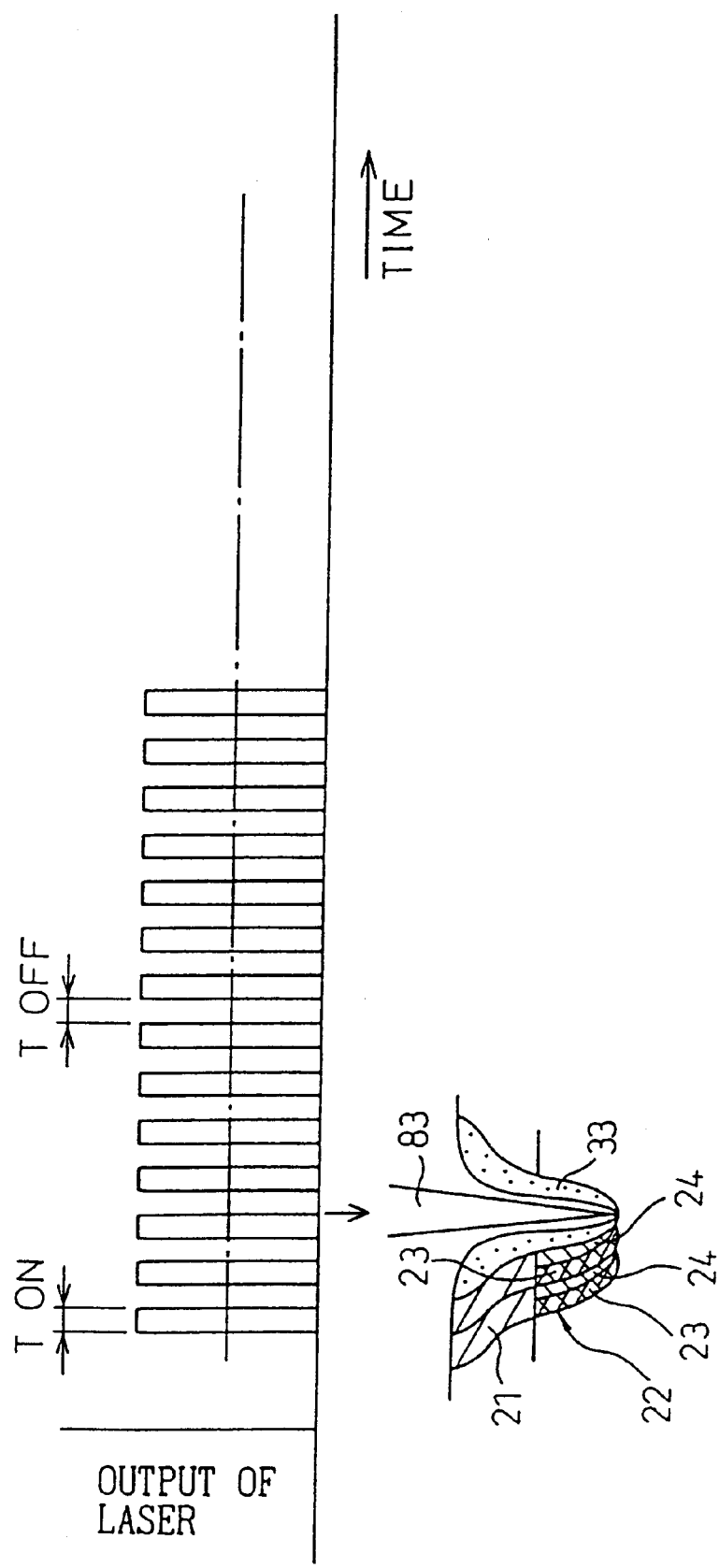

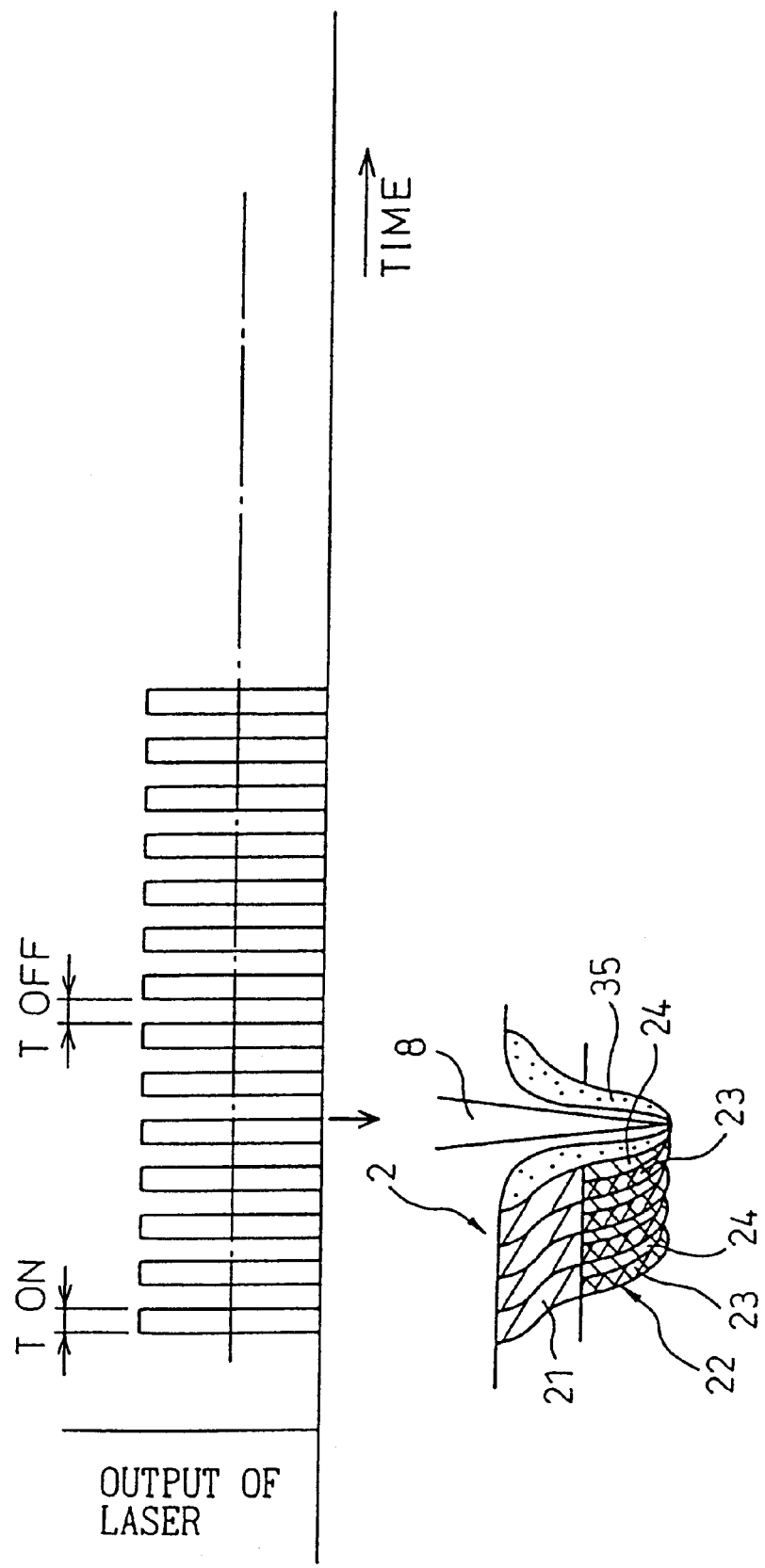

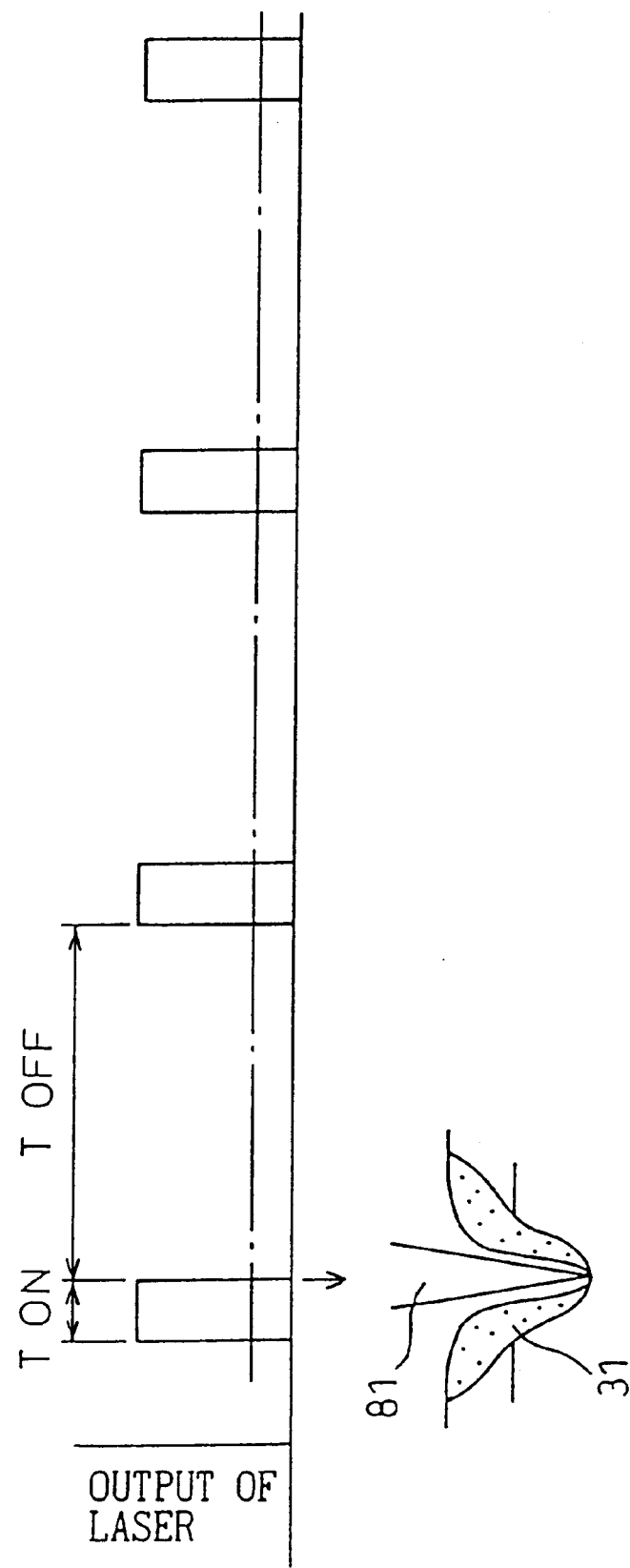

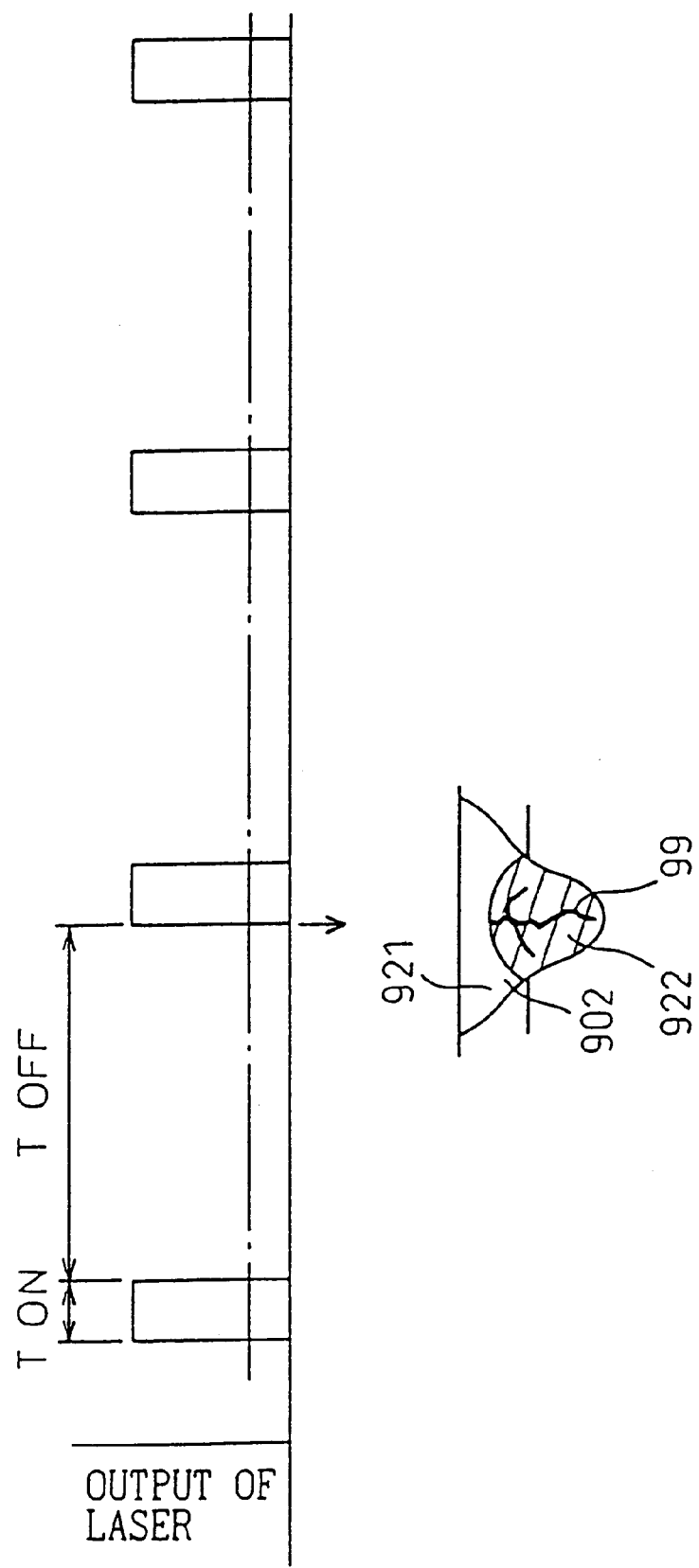

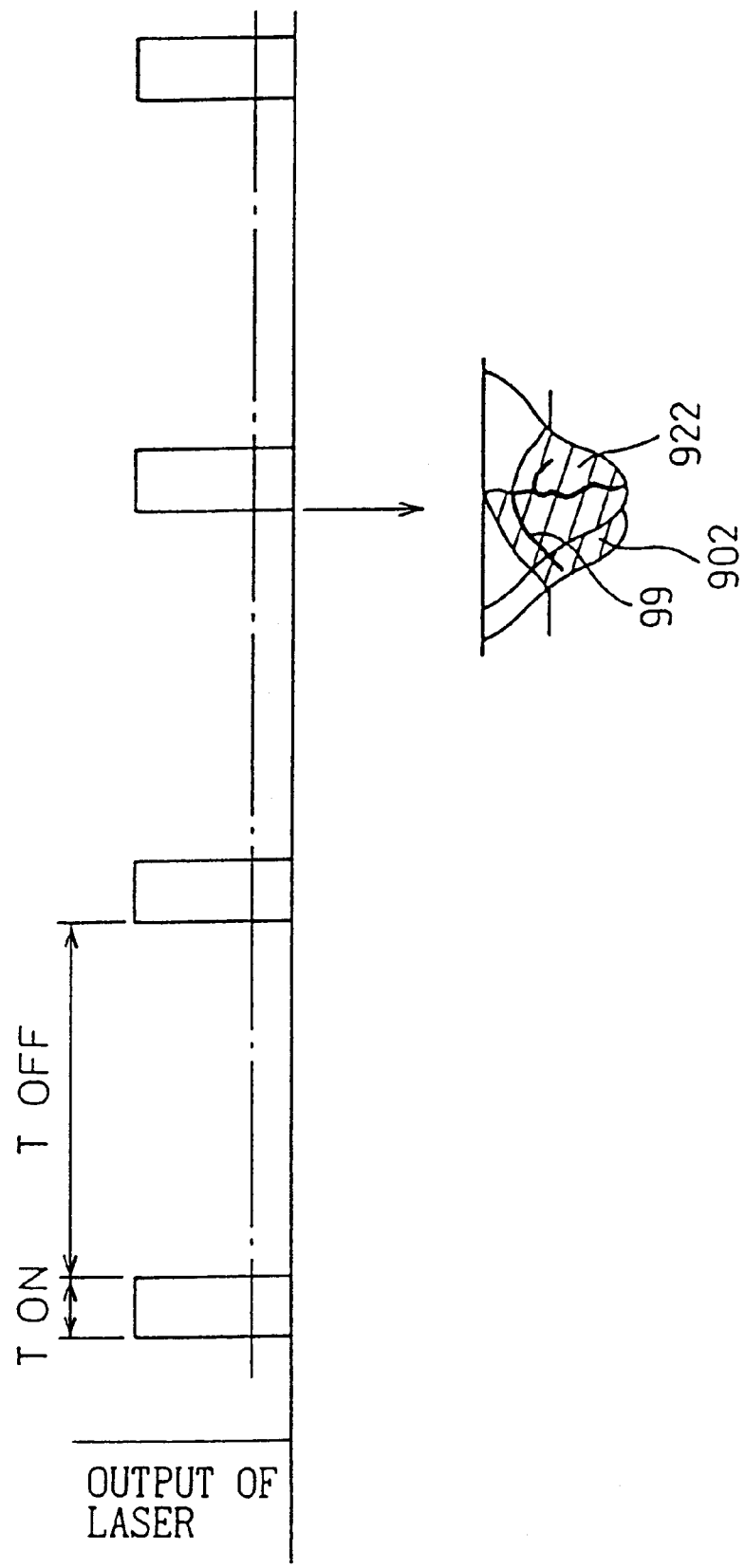

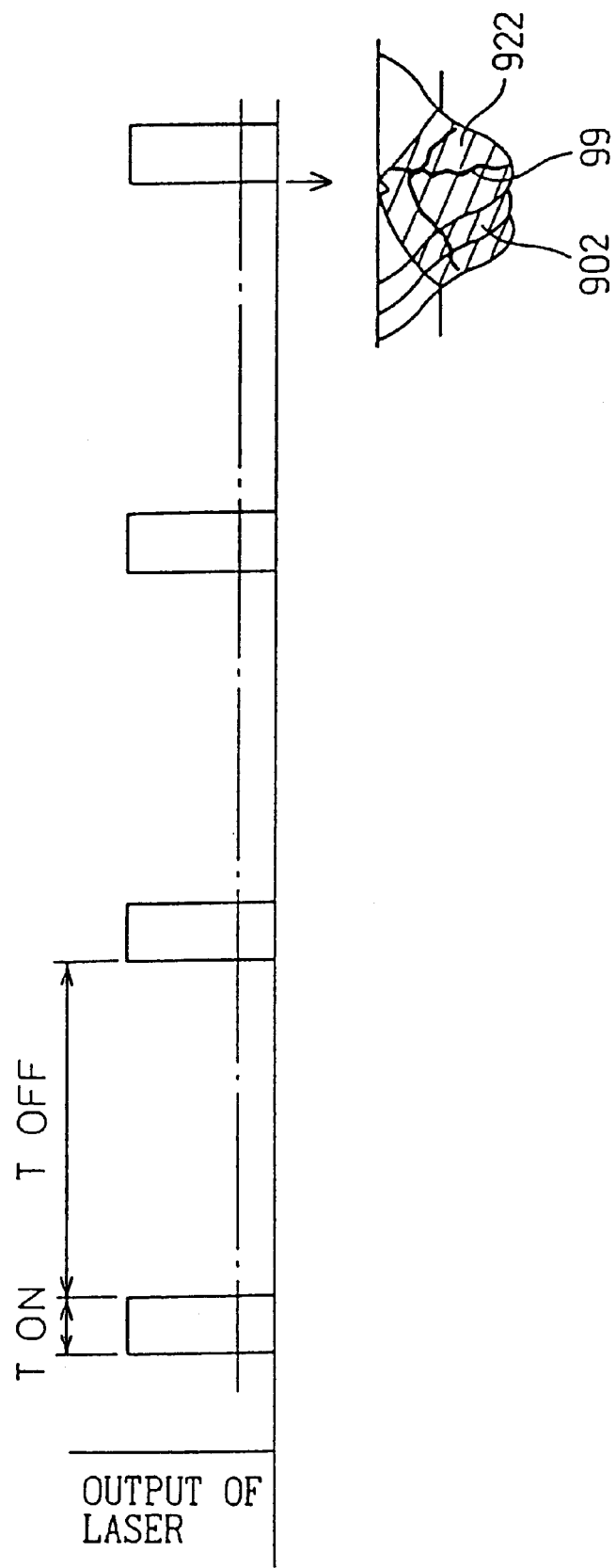

STRUCTURE OF AND METHOD FOR LASER WELDING METAL MEMBERS AND FUEL INJECTION VALVE

BACKGROUND OF THE INVENTION

1. Field of the Invention

The present invention relates to technology for joining different kinds of metal members, such as joining a magnetic material and a slide member, and relates to a sound welded structure in the laser junction technology and to a welding method.

2. Description of the Related Art

Referring, for example, to FIG. 1, a drive unit of a magnetically driven actuator is constituted by the combination of a slide member 91 having excellent wear resistance and a magnetic member 92 having excellent magnetic properties. A variety of junction methods can be employed for this combination.

A representative junction method may be a mechanical caulking method which is shown in FIG. 2. That is, a recessed portion 915 is formed in advance in the junction portion of the slide member 91, the magnetic member 92 is fitted thereon and is ironed from the outer side, so that the inside of the magnetic member 92 bites into the recessed portion 95 enabling the slide member 91 and the magnetic member 92 to be joined together. According to this method, however, the caulking strength is so small that the reliability of junction is poor.

There can be exemplified a so-called brazing method. According to this junction method, however, the member as a whole must be heated, causing the wear-resistant member to lose its hardness. Besides, the dimensional precision is deteriorated due to thermal distortion causing disadvantage even from the standpoint of machining cost.

As shown in FIG. 3, furthermore, there has been proposed a junction method based upon the laser-welding by irradiating a portion where the slide member 91 and the magnetic member 92 are overlapped one upon the other with a laser beam 8. According to this method which is based upon the local heating, the dimensional precision is not lost by heating, hardness is not lost, a large junction strength is obtained and a high machining rate is accomplished. It can, therefore, be said that the laser-welding could become a junction method featuring excellent productivity and low cost.

However, the following problems are involved in the welded structures obtained by the above-mentioned conventional laser-welding method.

Referring, for example, to the case of laser-welding a magnetic member and a slide member together, a ferrite type stainless steel or a nickel-iron type material is usually used as the magnetic member, and a high-carbon steel such as martensite type stainless steel having excellent hardenability is usually used as the slide member.

The ferrite type stainless steel or the nickel-iron type material has a relatively favorable weldability, but the high-carbon steel such as the martensite type stainless steel has poor weldability and is often cracked upon welding. When these different kinds of metal members are laser-welded together, therefore, cracks are very likely to develop in the melt-solidified portions being affected by the high-carbon steel that has poor weldability.

Concretely speaking, cracks 99 often develop in the melt-solidified portions 2 as shown in FIGS. 4 and 5.

To prevent the occurrence of cracks in the welded portions, the following methods may be employed; i.e., (a) a method wherein the depth of melt of the slide member is decreased, and a volume ratio of a melt of the magnetic material is increased, in order to decrease the amount of the carbon component which causes cracks in the molten portion;

(b) a method wherein the magnetic material is replaced by a high-nickel steel such as permalloy to improve the weldability, and the carbon component in the slide member is lowered; or (c) a method of employing a welded joint which permits tensile stress to build up little in the melt-solidified portion.

However, the above-mentioned methods (a) to (c) permit new problems to take place, and are not capable of solving the problems.

That is, according to the method (a), the depth of the molten portion and the hardness of the molten portion decrease, the welded strength loses stability, and reliability is lost. The method (b) causes the magnetic properties to decrease and drives up the cost of the materials. The method (c) impairs the degree of freedom in designing the product, causing disadvantage in the structure and in the cost of the product.

These problems are not limited to the case of laser-welding the magnetic member and the slide member together but could similarly occur in laser-welding various different kinds of metal materials.

The present invention was accomplished in view of the above-mentioned problems inherent in the prior art, and provides a laser-welded structure having sound melt-solidified portions without cracks and a laser-welding method therefor.

SUMMARY OF THE INVENTION

The present invention is concerned with a laser-welded structure of metal members, comprising:

a first member and a second member of metal materials of different kinds which are overlapped one upon the other, and a melt-solidified portion formed by the irradiation with a laser beam and arriving at said second member from the surface of said first member penetrating through said first member; wherein said melt-solidified portion has nearly an inverted triangular shape in cross section with its width becoming gradually narrow from the surface of said first member toward the inside thereof, and has a low-hardness layer on the front surface side of said melt-solidified portion and a high-hardness layer on the inside thereof; and said high-hardness layer has a structure in which first layers and second layers having a hardness smaller than that of said first layers are alternatingly laminated in a direction in which the welding proceeds.

In the present invention, what most draws attention is that the melt-solidified portion has nearly an inverted triangular shape (e.g., the shape of a wine cup) in cross section, and has a low-hardness layer and a high-hardness layer. The low-hardness layer is positioned on the front surface side and the high-hardness layer is positioned on the inside of the melt-solidified portion. That is, the low-hardness layer is located in a wide portion near the base of the inverted triangle and the high-hardness layer is located in a narrow portion near the vertex.

Attention should further be given to that the high-hardness layer is constituted by alternatingly laminating the first layers and the second layers in a direction in which the welding proceeds, and that the second layers have a hardness smaller than that of the first layers.

Next, the action and effect of the invention will be described.

In the laser-welded structure of the present invention, the melt-solidified portion has nearly the inverted triangular shape, and has the low-hardness layer on the front surface side and the high-hardness layer on the inside. Besides, the high-hardness layer is formed by alternatingly laminating the first layers and the second layers. Therefore, the laser-welded structure of the present invention is a sound structure without defect such as cracks.

The reasons are attributed as described below.

That is, when the molten portion solidifies during the laser welding, a strong tensile stress generates in the melt-solidified portion due to the thermal shrinking. The tensile stress becomes the greatest on the broad front surface side of the melt-solidified portion.

In the present invention, the low-hardness layer is arranged on the front surface side of the melt-solidified portion. The low-hardness layer exhibits a small hardness in contrast with the high-hardness layer, and exhibits excellent toughness.

Accordingly, the melt-solidified portion having a low-hardness layer withstands the tensile stress to a sufficient degree when it is being cooled, and does not develop cracks unlike that of the prior art.

On the inside of the melt-solidified portion, furthermore, the width of the melt is narrow and a small stress generates relative to the front surface side when it thermally shrinks. When the toughness is too small, however, resistance drops against the occurrence of the cracks. According to the present invention, on the other hand, a high-hardness layer formed by alternatingly laminating the first layers and the second layers, is provided on the inside of the melt-solidified portion. The second layers having a low hardness exhibit excellent toughness and make it possible to greatly enhance the toughness of the high-hardness layer as a whole. Unlike the prior art, therefore, cracks do not develop on the inside of the melt-solidified portion.

The low-hardness layer and the high-hardness layer are formed in the melt-solidified portion, and the first layers and the second layers are alternatingly formed in the high-hardness layer, relying, for example, on a laser-welding method of the present invention that will be described later.

According to the present invention, therefore, it is allowed to provide a laser-welded structure having a sound melt-solidified portion without welding cracks despite metal members of different kinds are welded together.

In a preferred embodiment of the present invention, the above-mentioned effects are particularly effectively exhibited when the second member has a resistance against welding cracks, which is smaller than that of the first member. That is, the melt-solidified portion is formed without developing welding cracks when a material having a relatively excellent resistance against the welding cracks is used as the first member and when a material having a smaller resistance against the welding cracks is used as the second member.

According to another preferred embodiment of the present invention, furthermore, the first member is a ferrite type stainless steel or a low-carbon steel, and the second member is a martensite type stainless steel or a high-carbon steel. That is, welding cracks easily occur when the ferrite type stainless steel or the low-carbon steel and the martensite type stainless steel or the high-carbon steel are laser-welded together. By constituting the melt-solidified portion as contemplated by the present invention, on the other hand, it is made possible to suppress the occurrence of welding cracks.

Here, the high-carbon steel stands for the one containing not less than 0.2% of carbon.

According to a further embodiment of the present invention, it is desired that the depth of the melt-solidified portion is from 1.1 to 2.2 times as great as the thickness of the first member. When the depth is smaller than 1.1 times, a sufficient degree of junction strength is not obtained. When the depth exceeds 2.2 times, on the other hand, the component of the high-carbon steel which is the second member affects up to the upper part of the molten portion, making it difficult to effectively form the low-hardness layer.

Next, in order to obtain the above-mentioned excellent laser-welded structure, the present invention provides a method of laser-welding metal members by overlapping a first member and a second member of metal materials of different kinds one upon the other, and irradiating the surface of said first member with pulses of a laser beam to form a melt-solidified portion; wherein said laser beam is so projected that said first member and said second member are melted by the laser beam of a first pulse to thereby form a first molten portion, projection of the laser beam of a second pulse is started before the growth of solidification of said first molten portion reaches the distance of motion of the laser beam axis thereby to form a second molten portion in a manner that it partly overlaps said first molten portion and, then, the third and subsequent pulses of the laser beam are successively projected being turned on and off maintaining a predetermined interval, in order to form a melt-solidified portion having a low-hardness layer formed on the front surface side and a high-hardness layer on the inside, the high-hardness layer being formed by alternatingly laminating first layers and second layers having a hardness smaller than that of said first layers in a direction in which the welding proceeds.

In this method of laser welding, what most draws attention is that the timing for irradiating the laser beam is controlled as described above.

The content of the present invention will now be described together with its action and effect.

In the present invention, first, the first molten portion is formed by the laser beam of a first pulse. The first molten portion starts solidifying as it releases heat immediately after the termination of irradiation of the first pulse of laser beam. Next, irradiation of the laser beam of the second pulse is started before the growth of solidification of the first molten portion reaches the distance of motion of the laser beam axis.

Therefore, the first molten portion quickly solidifies in a customary manner before it is irradiated with the laser beam of the second pulse. After the start of irradiation of the laser beam of the second pulse, the first molten portion solidifies and cools at a relaxed rate due to the input of heat (mild solidification and cooling). In parallel with this, furthermore, a second molten portion is formed.

Due to the temperature gradient of when heat is input from the laser beam of the second pulse, furthermore, the first molten portion solidifies and grows in a direction in which the welding proceeds. Therefore, a molten portion constituted chiefly by the first member and a molten portion constituted chiefly by the second member solidify without so much mixed together. Besides, the volume of the melt is great on the front surface side, and the solidifying/cooling rate decreases toward the inside, forming a low-hardness layer on the front surface side and a high-hardness layer on the inside.

The position on where the laser beam of the second pulse falls moves toward the welding direction from the position on where the first pulse falls, and the second molten portion is formed partly overlapping the first molten portion. Depending upon the amount of deviation between the first molten portion and the second molten portion, furthermore, the size of the mildly solidified/cooled portion is determined.

Immediately after the termination of irradiation of the second pulse of laser beam, the second molten portion starts quickly solidifying. Then, the laser beam of a third pulse is irradiated at a moment when the quickly solidified second molten portion grows to just in short of the distance of motion of the laser beam axis in the same manner as described above. Due to heat input from the laser beam of the third pulse, the second molten portion solidifies and cools at a relaxed rate. In parallel with this, furthermore, a third molten portion is formed.

In the same manner as described above, the position where the laser beam of the third pulse falls moves toward the welding direction from the position where the second pulse falls, and the third molten portion is formed partly overlapping the second molten portion.

Similarly, fourth, fifth and subsequent pulses of the laser beam are successively projected.

According to the laser-welding method of the present invention as described above, the laser beam is projected like pulses, and the timing of projection is controlled as described above. Therefore, the melt-solidified portion formed as the first, second, third and subsequent molten portions, is solidified, acquires nearly an inverted triangular shape in cross section, and possesses a low-hardness layer on the front surface side and a high-hardness layer on the inside.

The first, second and subsequent molten portions successively form quickly solidified portions and mildly solidified/cooled portions, and are solidified in the welding direction. In at least the high-hardness layer, therefore, there are alternatingly formed first layers that are quickly cooled and solidified and second layers that are mildly solidified and cooled. The second layers have a hardness smaller than that of the first layers due to their solidifying/cooling rate.

According to the present invention, therefore, there is formed a melt-solidified/cooled portion having a low-hardness layer formed on the front surface side and a high-hardness layer formed on the inside, the high-hardness layer including first layers (having a high hardness) and second layers (having a low hardness) alternatingly formed in the direction in which the welding proceeds.

Despite a strong tensile stress that generates during the cooling, therefore, the obtained welded structure does not develop crack and maintains sound structure.

As described above, the present invention provides a method of laser welding capable of forming a sound melt-solidified portion without cracks even when metal members of different kinds are welded together.

According to the present invention, it is desired that the pulse frequency of the laser beam is not lower than 100 Hz. When the pulse frequency is lower than 100 Hz, it becomes difficult to project the laser beam maintaining the above-mentioned timing. It is desired that the upper limit is not larger than 300 Hz because of the reason that a change in the cooling rate does not clearly appear at the time of solidification.

According to the present invention, furthermore, it is desired that the pulses of the laser beam has a pulse-on duty as expressed by $(T_{ON}/(T_{ON}+T_{OFF}))\times 100$ of from 30 to 70%, wherein $T_{ON}$ is the on time in which the laser beam is continuously emitted, and $T_{OFF}$ is the off time in which no laser beam is emitted.

When the pulse-on duty is smaller than 30%, the balance between the heating during the on-time and the cooling during the off-time, shifts toward the overcooling side, making it difficult to form the melt-solidified portion which is separated into the low-hardness layer and the high-hardness layer. When the pulse-on duty exceeds 75%, on the other hand, the balance shifts toward the overheating side making it difficult to alternatingly laminate the first layers and the second layers like when the laser beam is continuously projected.

According to the present invention, furthermore, it is desired that the laser beam is so projected that the rate of welding the junction interface between the first member and the second member is not smaller than 5 mm/second. Here, the rate of welding the junction interface stands for a moving speed of the laser beam on the junction interface.

When the rate of melting the junction interface is smaller than 5 mm/second, the moving amount of the laser beam per a unit time is so small that the molten portion is stirred up and down, and the low-hardness layer and the high-hardness layer are not formed well.

According to the present invention, furthermore, it is desired that the laser beam is so projected that the depth of the molten portion is from 1.1 to 2.2 times as great as the thickness of the first member. When the depth is smaller than 1.1 times, the junction area on the junction interface loses stability and stable strength is not obtained. When the depth exceeds 2.2 times, on the other hand, the stirring easily occurs up and down in the molten portion, making it difficult to form the low-hardness layer and the high-hardness layer.

According to the present invention, furthermore, it is desired that the molten portion is periodically and stepwisely solidified in match with the pulse period of the laser beam, and the length of solidification after each period is not larger than 100 $\mu$m in the direction in which the laser beam proceeds. Here, the length of solidification stands for a total length of the quickly solidified portion and of the mildly solidified portion.

In this case, the length of crystal obtained by the stepwise solidification can be set to be not larger than 100 $\mu$m to make fine the texture of the melt-solidified portion. It is desired that the lower-limit value of the length of solidification is not smaller than 20 $\mu$m to stably form the high-hardness layer and the low-hardness layer.

In the present invention, furthermore, it is desired that the distance which the laser beam moves within a pulse interval is not larger than one-fifth the width of the junction interface of the molten portion. When the distance exceeds one-fifth, the amount of deviation of the molten portions decreases and the length of solidification increases, whereby the stirring effect increases making it difficult to stably form the low-hardness layer and the high-hardness layer. When the moving distance is too short, the laser beam approaches the continuous projection. It is therefore desired that the moving distance is not smaller than 1/20.

The pulse interval stands for a time of from a start of pulse-on to next start of pulse-on in a sequence of pulses repeating on and off.

In the present invention, furthermore, it is desired that an average output of the laser beam pulses is lowered in the form of a slope or stepwisely, so that the depth of melt in the molten portion lies within a predetermined range of depth. In this case, it is allowed to prevent the melt-solidified portion from becoming deep due to the accumulation of heat in the metal member as the projection of laser beam is repeated.

In the present invention, it is desired that the projection of the laser beam is terminated at the end of the welding after the average output of the laser beam is lowered like a slope. This makes it possible to prevent the occurrence of cracks caused by the stress of thermal shrinking that stems from the sudden discontinuation of the input of heat.

Next, the invention produces a product by employing the above-mentioned excellent laser-welding method.

That is, the invention is concerned with a fuel-injection valve for internal combustion engines, comprising a fixed core having a fuel-supply passage for supplying fuel, a housing surrounding said fixed core, a valve body having an injection port formed at an end of said housing and for injecting the fuel, a needle valve provided in said valve body and moves back and forth to open and close said injection port, and a moving core joined to said needle valve and moves back and forth in said housing based on an electro-magnetic force, wherein said needle valve and said moving core are joined together relying on the method of laser-welding metal members according to any one of claims 5 to 13.

In the present invention, what most draws attention is that the junction of the needle valve and the moving core is accomplished relying upon the above-mentioned method of laser-welding the metal members.

The needle valve repeats the operation for coming in contact with the valve body in order to open and close the injection port and is, hence, made of a steel having excellent toughness, such as a ferrite type stainless steel or a low-carbon steel. On the other hand, the moving core is made of, for example, a martensite type stainless steel or a high-carbon steel in order to obtain ferromagnetic properties. That is, these two members are made of metals of different kinds.

In the present invention, the needle valve and the moving core made of different kinds of metals are welded by the above-mentioned excellent laser-welding method. Therefore, the laser-welded structure formed between these two members is a sound structure without defect such as welding crack. This contributes to greatly improving the durability at the welded portion between the needle valve and the moving core and, hence, to improving the durability of the fuel injection valve.

In the present invention, furthermore, the moving core has a cylindrical junction drum portion with an inner hole while the needle valve has a junction end that can be inserted in the inner hole of the junction drum portion. It is desired that these two members form the melt-solidified portion with the surface of the junction drum portion being irradiated with the laser beam from the external side in a state where the junction end is being inserted in the inner hole of the junction drum portion. In this case, the junction between the needle valve and the moving core can be further strengthened.

BRIEF DESCRIPTION OF THE DRAWINGS

FIG. 7 is a view illustrating a laser-welding method according to Example 1;

EMBODIMENTS OF THE INVENTION

EXAMPLE 1

A laser-welded structure and a laser-welding method according to the present invention will now be described with reference to FIGS. 6A and 6B and FIG. 7.

Figure 6A:
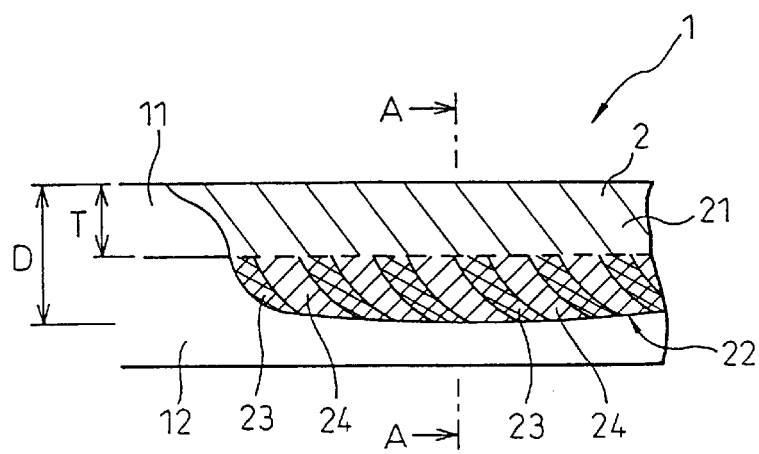
FIG. 6A is a transverse sectional view of a laser-welded structure according to Example 1.
Figure 6B:
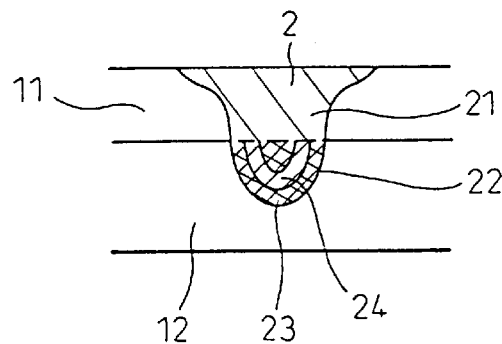
FIG. 6B is a sectional view along the line A—A of FIG. 6A.

As shown in FIGS. 6A and 6B, the laser-welded structure 1 according to this Example is obtained by overlapping a first member 11 on a second member 12 of different kinds, and irradiating the surface of the first member 11 with a laser beam to form a melt-solidified portion 2.

The melt-solidified portion 2 has, as shown in FIG. 6A, a nearly inverted triangular shape in cross section with its width becoming gradually narrow toward the inside from the surface of the first member 11. The melt-solidified portion 2 further has a low-hardness layer 21 on the front surface side and a high-hardness layer 22 on the inside. The high-hardness layer 22 is formed by alternatingly laminating first layers 23 and second layers 24 having a hardness smaller than that of the first layers 23 in the direction in which the welding proceeds.

In this Example, the first member 11 is made of a ferrite type stainless steel while the second member 12 is made of a martensite type stainless steel.

The depth D of the melt-solidified portion is confined within a range of from 1.1 to 2.2 times as great as the thickness T of the first member 11.

Next, described below is a laser-welding method for obtaining the above-mentioned laser-welded structure 1.

In this Example, the first member 11 is overlapped on the second member 12, and the surface of the first member 11 is irradiated with a laser beam like pulses to form the melt-solidified portion 2.

As shown in FIG. 7, a first molten portion 31 is formed by melting the first member 11 and the second member 12 using a laser beam 81 of a first pulse.

Then, projection of a laser beam 82 of a second pulse is started at a moment when the growth of solidification of the first molten portion 31 has reached about one-half the distance of motion of the laser beam axis. Thus, a second molten portion 32 is formed so as to be partly overlapped on the first molten portion 31.

Similarly, thereafter, the third and subsequent laser beam pulses 83, 84, - - - are projected in a manner of being turned on and off maintaining a predetermined interval.

The laser-welding method will be described in further detail together with its action.

First, a pulse YAG laser beam or a pulse-modulated continuous YAG laser beam is used as the laser beam 8 in this Example, the pulse frequency being selected to be 200 Hz and the pulse-on duty being selected to be 50%.

Therefore, the laser-on time ($T_{ON}$) and the laser-off time ($T_{OFF}$) become the same, i.e., 2.5 ms. In FIG. 7, the ordinate represents the output of the laser beam, the abscissa represents the time, and the welded states at various moments are illustrated in (a) to (e).

As shown in FIG. 7(a), the first molten portion 31 formed by the laser beam 81 of the first pulse is a growth of solidification which is about one-half the distance of motion of the laser beam axis even just before being irradiated with the laser beam 82 of the second pulse as shown in FIG. 7(b). This portion is solidified at a large rate and forms the first layer 23 of a high hardness in the high-hardness layer 22 on the inside. On the front surface side, on the other hand, the solidified portion is constituted chiefly by the first member of the ferrite type stainless steel. On the front surface side, furthermore, the melt has a large volume and is solidified and cooled at a rate smaller than that on the inside. Therefore, the melt solidifies to form the low-hardness layer 21 having a hardness smaller than that of the high-hardness layer 22 and having a large toughness.

Referring next to FIG. 7(c), the second molten portion 32 is formed by the irradiation with the laser beam 82 of the second pulse so as to be partly overlapped on the first molten portion 31. In FIG. 7(c), part of the first molten portion 31 which has not yet been solidified undergoes the solidification and cooling at a relaxed cooling rate (mild solidification and cooling) due to the input of heat from the laser beam of the second pulse.

The front surface side of the first molten portion 31 forms a similar low-hardness layer 21 continuous to the low-hardness layer 21 that is formed through the solidification and cooling milder than those of the inside. The inside of the first molten portion 31 undergoes the mild solidification and cooling to form the second layer 24 having a hardness smaller than that of the first layer 23, thereby to constitute the high-hardness layer 22. In this Example, the second layer 24 had a thickness nearly the same as the thickness of the first layer 23.

The direction of solidification of the melt-solidified portion 2 constituted by the low-hardness layer 21 and the high-hardness layer 22, i.e., the direction of growth of the crystals, is in a direction in which the laser beam moves (direction in parallel with the junction interface).

Next, at a moment when the irradiation of the laser beam of the second pulse is terminated, the second molten portion 32 starts quickly solidifying. Therefore, the low-hardness layer 21 continues to grow on the front surface side of the molten portion, and the first layer 23 is formed as a high-hardness layer 22 on the inside.

Next, upon the start of irradiation of the laser beam 83 of the third pulse, part of the second molten portion that has not been solidified yet undergoes the solidification at a relaxed cooling rate. Therefore, the low-hardness layer 21 further grows on the front surface side of the second molten portion, and the high-hardness layer 22 grows as the second layer 24 is formed again on the inside.

Referring to FIG. 7(d), a third molten portion 33 is formed so as to be partly overlapped on the second molten portion 32 at a moment when the irradiation with the laser beam 83 of the third pulse is terminated.

Next, the third molten portion 33 starts quickly solidifying just after the termination of the laser beam 83 of the third pulse.

Referring next to FIG. 7(e), the fourth, fifth, - - - laser beam pulses are projected maintaining the above-mentioned timing, whereby the low-hardness layer 21 continues to grow on the front surface side of the molten portion, and the first layer 23 and the second layer 24 are repetitively formed on the inside, so that the high-hardness layer 22 continues to grow. These growths proceed stepwisely in match with the irradiation timing of the laser beam.

As a result, the melt-solidified portion 2 becomes a set of stepwisely grown crystals, which is a very complex structure. The melt-solidified portion 2 is formed in a two-layer structure having the low-hardness layer 21 and the high-hardness layer 22. Moreover, the high-hardness layer 22 is formed by alternatingly laminating the first layers 23 having a relatively high hardness and the second layers 24 having a smaller hardness.

The low-hardness layer 21 possessed a hardness of Hv230 to 280 and the high-hardness layer 22 possesses a hardness of Hv400 to 800.

As described above, the melt-solidified portion 2 obtained in this Example has the low-hardness layer 21 and the high-hardness layer 22, the high-hardness layer 22 including the first layers 23 and the second layers 24 that are alternatingly laminated therein. Therefore, no crack develops during the step of cooling.

That is, the tensile stress develops when the melt-solidified portion 2 is cooled, the stress increasing toward the broad front surface side. As described above, the low-hardness layer 21 is located on the front surface side of the melt-solidified portion 2. The low-hardness layer 21 has a low hardness and an excellent toughness. Therefore, the low-hardness layer 21 withstands even a strong tensile stress produced by the thermal shrinking.

The high-hardness layer 22 contains the first layers 23 and the second layers 24 that are alternatingly laminated as described above. The second layer 24 has a relatively low hardness but exhibits excellent toughness. Therefore, the high-hardness layer 22 as a whole exhibits excellent toughness and prevents the occurrence of cracks on the inside of the melt-solidified portion 2.

According to this Example, therefore, the laser-welded structure 1 is obtained in a sound form without cracks.

COMPARATIVE EXAMPLE 1

In order to further clarify the effect of the Example, the first member 11 and the second member 12 were laser-welded according to a conventional laser-welding method.

Figure 3:
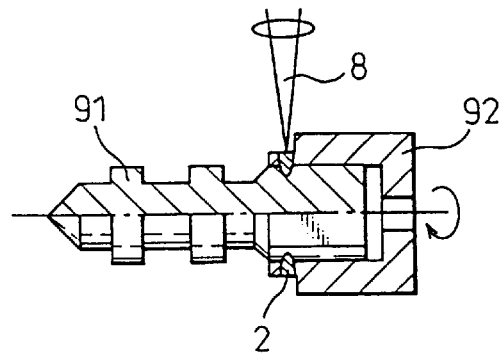
FIG. 3 is a view illustrating a welded structure based on a laser-welding method according to a prior art.
Figure 4:
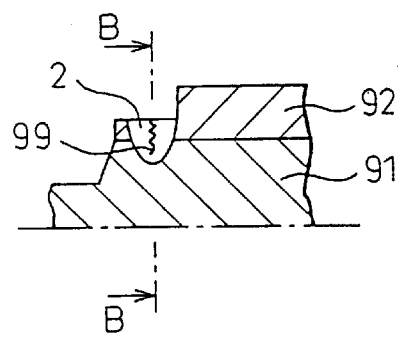
FIG. 4 is a view illustrating a defect in the laser-welded structure according to a prior art.
Figure 5:
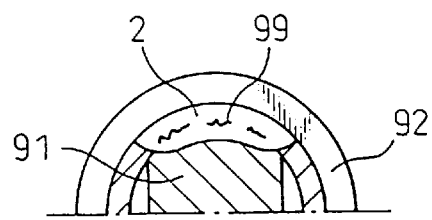
FIG. 5 is a sectional view along the line B—B of FIG. 4.

Concretely speaking as shown in FIG. 3, the frequency of the pulse YAG laser was set to be 10 Hz and the pulse-on duty was set to be 20%. Therefore, the laser-on time was 20 ms and the laser-off time was 80 ms.

Other conditions were the same as those of Example 1.

Figure 8C:
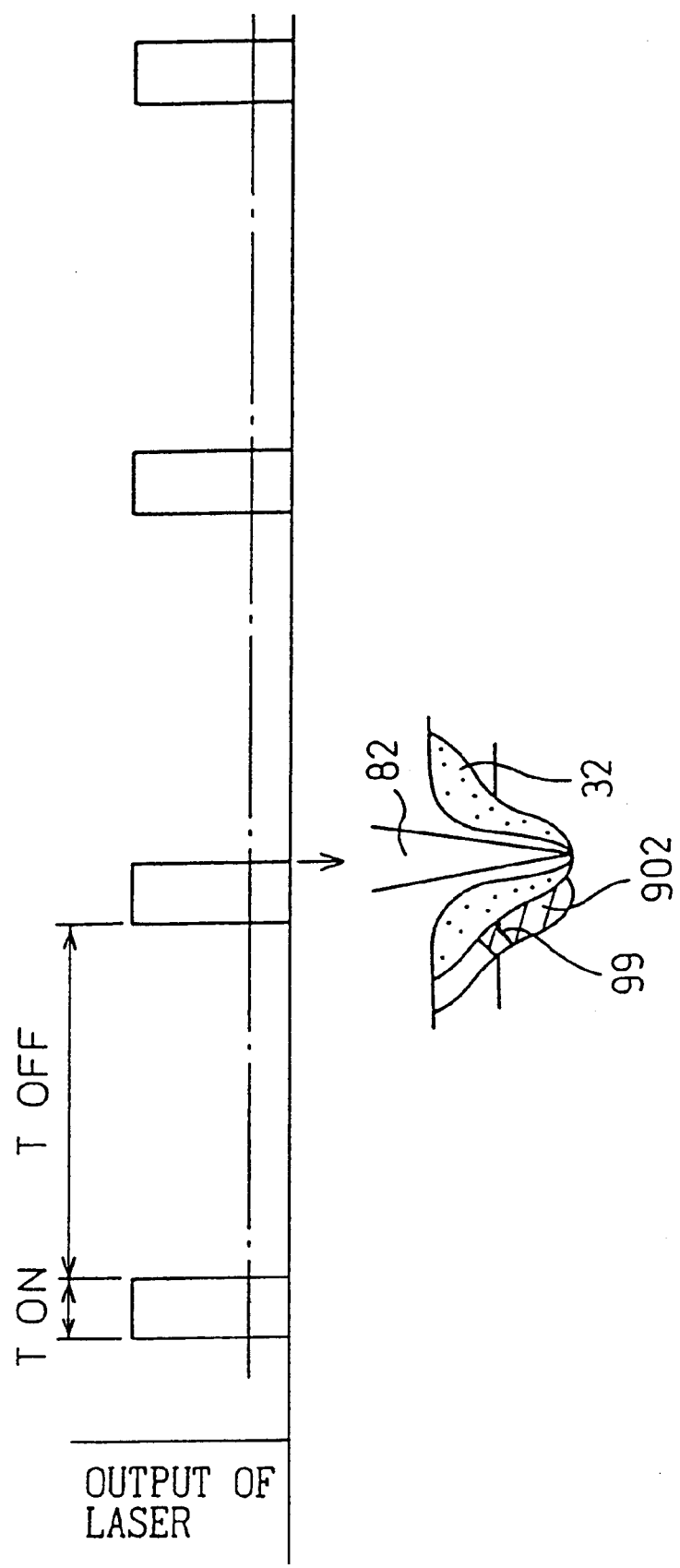
FIG. 8 is a diagram illustrating a laser-welding method according to Comparative Example 1.

In this Comparative Example as shown in FIG. 8, after the irradiation with the laser beam 81 of the first pulse has been terminated, the pulse-off time ($T_{OFF}$) is very longer than that of the case of Example 1. Therefore, the molten portion 31 formed by the laser beam 81 is solidified to form a melt-solidified portion 902 before being irradiated with the laser beam 82 of a second pulse. At this moment, the melt-solidified portion 902 is completely solidified being divided into a hard inner layer 922 and a soft outer layer 921. In the step of cooling, furthermore, cracks 99 develop in the melt-solidified portion 902.

Next, upon the irradiation with the laser beam 82 of the second pulse, a second molten portion 32 is formed so as to be partly overlapped on the melt-solidified portion 902 formed by the first molten portion 31. Despite the molten portion 32 is formed, cracks 99 are not completely extinguished in the melt-solidified portion 902.

The molten portion 32 is solidified before the irradiation with the laser beam of the third pulse, and the melt-solidified portion 902 spreads. The hard inner layer 922 in the melt-solidified portion 902 gradually grows upward and, finally, the hard inner layer 22 exists on the whole surface in the direction of depth. In the melt-solidified portion 902, new cracks 99 develop at the time of shrinking starting from the existing cracks 99.

That is, in this Comparative Example, the solidification and melting are repeated, and cracks develop at a high frequency.

From the results of the above Comparative Example 1 and Example 1, when the first member 11 and the second member 12 of different kinds are to be welded together, cracks develop according to the conventional laser-welding method. By employing the laser-welding method of the present invention, however, occurrence of cracks can be avoided, and the above-mentioned sound laser-welded structure 1 is obtained.

EXAMPLE 2

Figure 1:
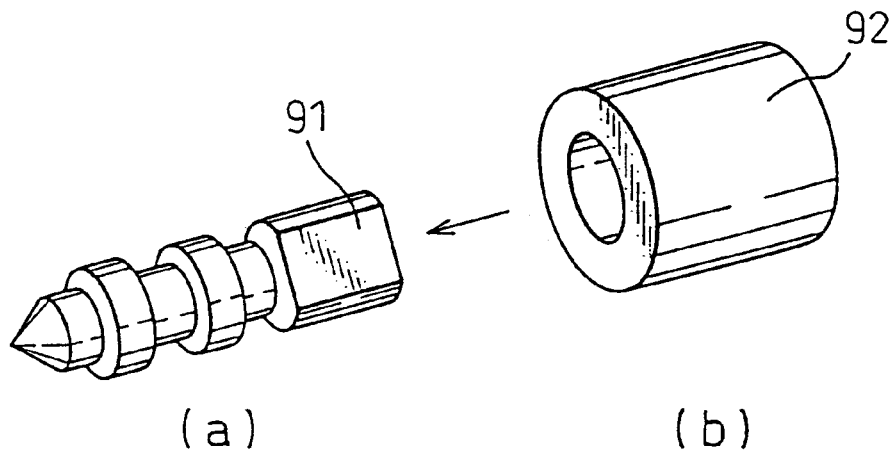
FIG. 1 is a perspective view of a slide member (a) and a magnetic member (b) according to a prior art.
Figure 2:
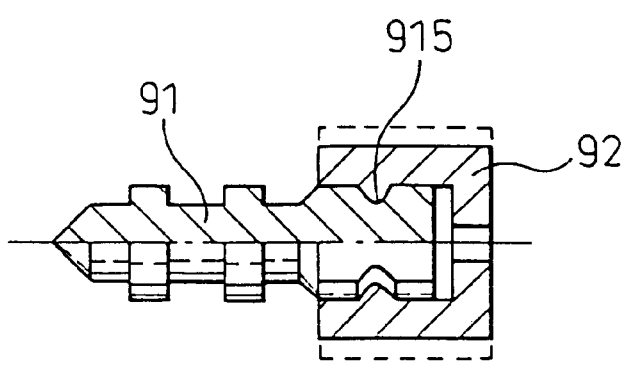
FIG. 2 is a view illustrating a connection structure based on the mechanical caulking according to a prior art.
Figure 9A:
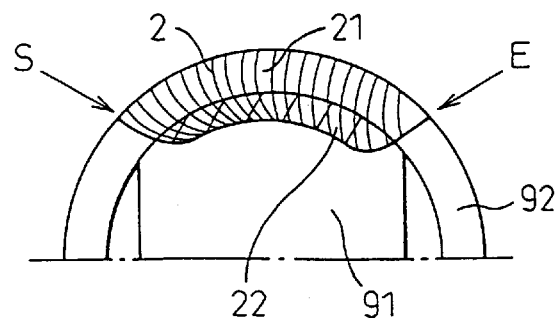
FIG. 9A is a view illustrating the laser-welded structure according to Example 2.
Figure 9B:
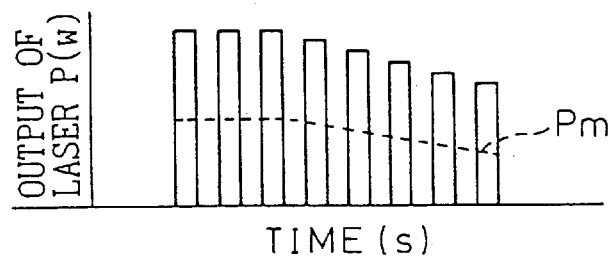
FIG. 9B is a view illustrating a change in the output of the laser beam.

In this Example as shown in FIGS. 9A and 9B, the slide member 91 and the magnetic member 92 of the prior art (FIG. 1) were welded together in combination.

This Example employed the laser-welding method like that of Example 1, and the average output Pm of the laser beam pulses was continuously decreased on its way as shown in FIG. 9A. In other respects, this Example was the same as Example 1.

In the laser-welded structure obtained in this Example as shown in FIG. 9A, the melt-solidified portion 2 assumed the two-layer structure comprising a low-hardness layer 21 located on the front surface side and a high-hardness layer 22 located on the inside. The high-hardness layer 22 possessed a structure in which the first layers of a high hardness and the second layers of a low hardness were alternatingly laminated in the direction of welding.

The melt-solidified portion 2 was controlled to possess a nearly uniform depth from a portion S where the laser-welding started to a portion E where the laser-welding ended. No crack was recognized.

Figure 10A:
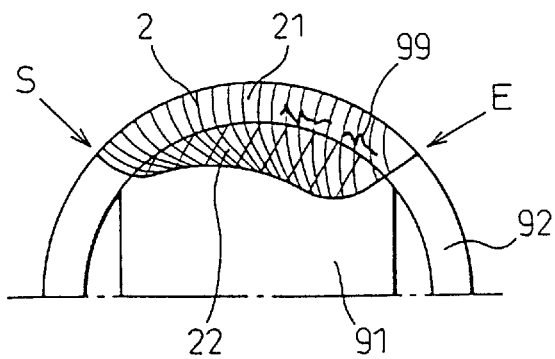
FIG. 10A is a view illustrating the laser-welded structure according to Comparative Example in Example 2.
Figure 10B:
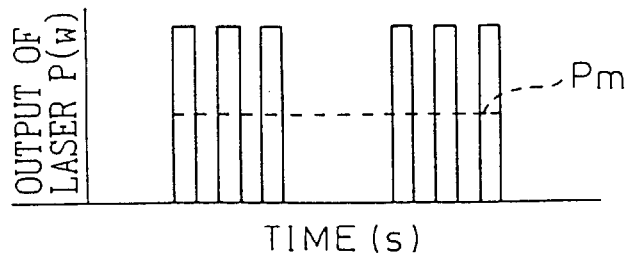
FIG. 10B is a view illustrating a change in the output of the laser beam.

Next, for the purpose of comparison in this Example, the laser-welding was conducted while setting the average output Pm of the laser beam pulses to be the same from the start to the end as shown in FIG. 10B. In other respects, the Example was the same as the one described above.

As a result as shown in FIG. 10A, the depth of the melt-solidified portion 2 in the thus obtained welded structure gradually increased from the portion S of starting the laser-welding toward the portion E of ending the laser-welding. This is presumably due to heat stored in the first member 11 and the second member 12.

Cracks 99 also developed in the melt-solidified portion 2 having an increased depth.

It will be understood from the above results that when the melt-solidified portion 2 is to be formed over a relatively long distance, it is important to lower the average output Pm of the laser beam pulses 8, so that the depth will not increase too much.

In this Example, though the average output Pm of pulses was continuously lowered like a slope, the same effect is obtained even when the average output Pm is lowered stepwisely.

EXAMPLE 3

Figure 11A:
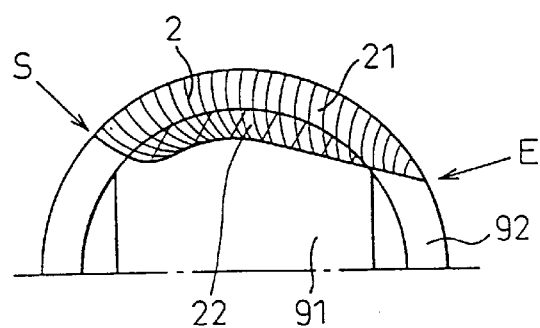
FIG. 11A is a view illustrating the laser-welded structure according to Example 3.
Figure 11B:
FIG. 11B is a view illustrating a change in the output of the laser beam.

In this Example as shown in FIG. 11B, the average output PM of laser beam pulses was stepwisely lowered on its way. At the end of the irradiation of the laser beam, furthermore, the output was lowered like a slope and, finally, the output was set to be from 0 to not larger than one-half the output of before it was lowered like a slope. In other respects, this Example was the same as Example 2.

As a result as shown in FIG. 11A, the melt-solidified portion 2 possessed the low-hardness layer 21 and the high-hardness layer 22, the high-hardness layer 22 including the first layers having a high hardness and the second layers having a low hardness that are alternatingly laminated in the direction of welding, realizing a sound welded structure without crack.

In this case, furthermore, it is allowed to reliably prevent the occurrence of cracks due to stress of heat shocks when the input of heat is abruptly terminated at the end of irradiation with the laser beam.

In other respects, the effects are the same as those of Examples 1 and 2.

EXAMPLE 4

This Example is concerned with a fuel injection valve 4 which is a product obtained by utilizing the laser-welding method of Example 1.

Figure 12:
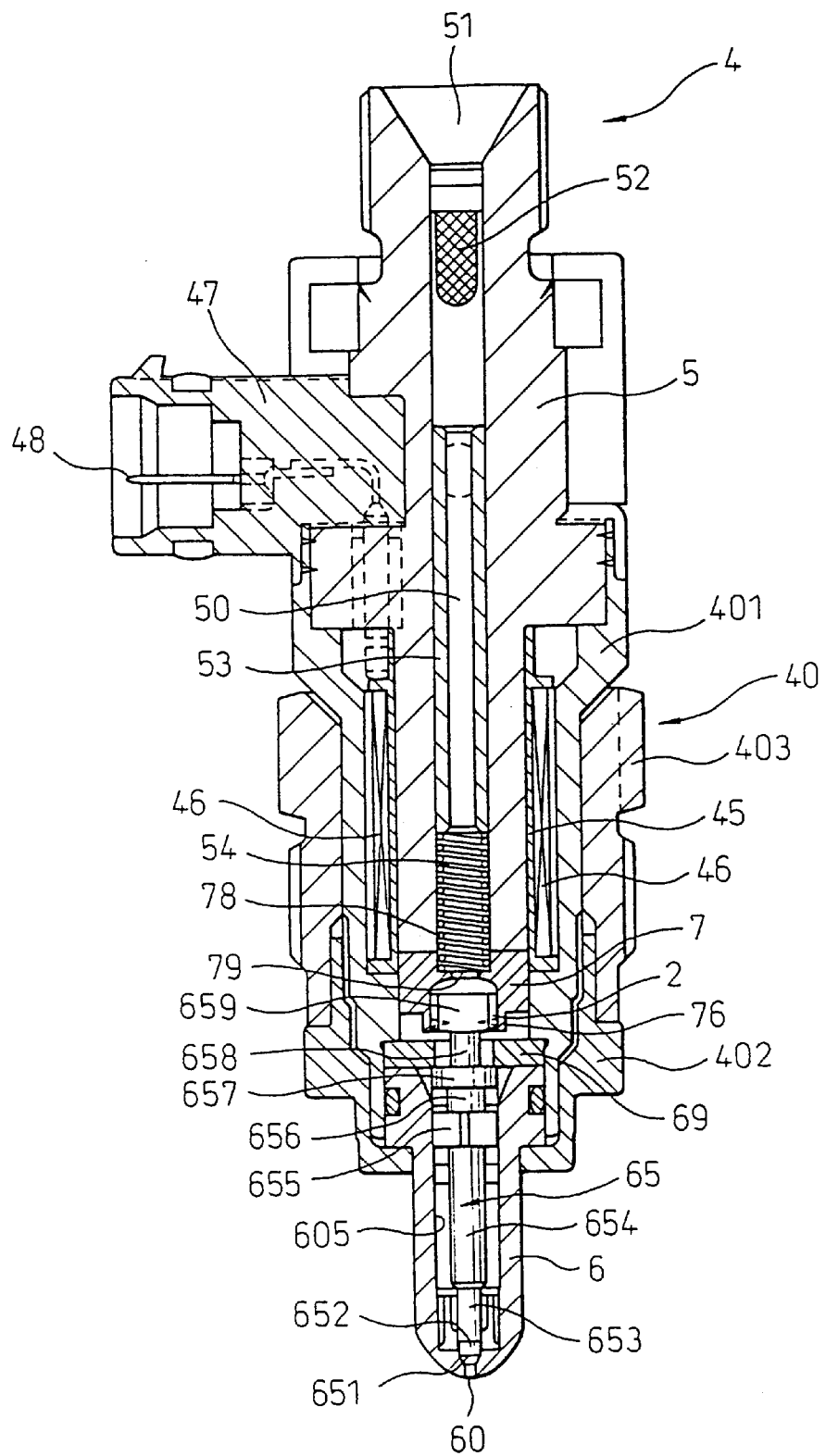
FIG. 12 is a view illustrating the structure of a fuel injection valve according to Example 4.

As shown in FIG. 12, the fuel injection valve 4 of this Example includes a fixed core 5 having a fuel-supply passage 50 for supplying fuel, a housing 40 surrounding the fixed core 5, and a valve body 6 having an injection port 60 formed at the end of the housing 40 for injecting the fuel.

The fuel injection valve 4 further includes a needle valve 65 which moves back and forth in the valve body 6 to open and close the injection port 60, and a moving core 7 joined to the needle valve 65 and moves back and forth in the housing 4 relying on the electromagnetic force.

The junction between the needle valve 65 and the moving core 7 is accomplished based on the laser-welding method described in Example 1.

This will now be described in detail.

As shown in FIG. 12, the housing 40 is constituted by a combination of a first housing 401, a second housing 402 and a third housing 403. The fixed core 5 is held by the housing 40, and a valve body 6 is arranged on the lower side thereof via the moving core 7 and a spacer 69.

As shown, the fixed core 5 contains the fuel-supply passage 50 therein, and has a fuel inflow port 51 and a filter 52 for preventing the infiltration of foreign matter at an upstream end thereof. A cylindrical adjusting pipe 53 is arranged on the downstream side of the filter 52 to adjust the urging force of the spring 54.

Under the fixed core 5 is disposed the moving core 7 that is held to move back and forth in the first housing 401.

As shown, the moving core 7 is downwardly urged by the spring 54. To the moving core 7 is joined the needle valve 65 that is arranged to penetrate through the spacer 69.

The needle valve 65 moves back and forth together with the moving core 7 and comes at its end 651 into contact with the valve body 6 to close the injection port 60.

Between the fixed core 5 and the first housing 401, furthermore, an electromagnetic coil 46 is arranged being wound on a plastic spool 45. The electric power is supplied to the electromagnetic coil 46 through a terminal 48 provided in a plastic connector 47. In the fuel injection valve 4 of this Example, a predetermined magnetic field is generated by the electromagnetic coil 46 in order to control the back-and-forth motion of the moving core 7 which is a magnetic material.

Figure 13:
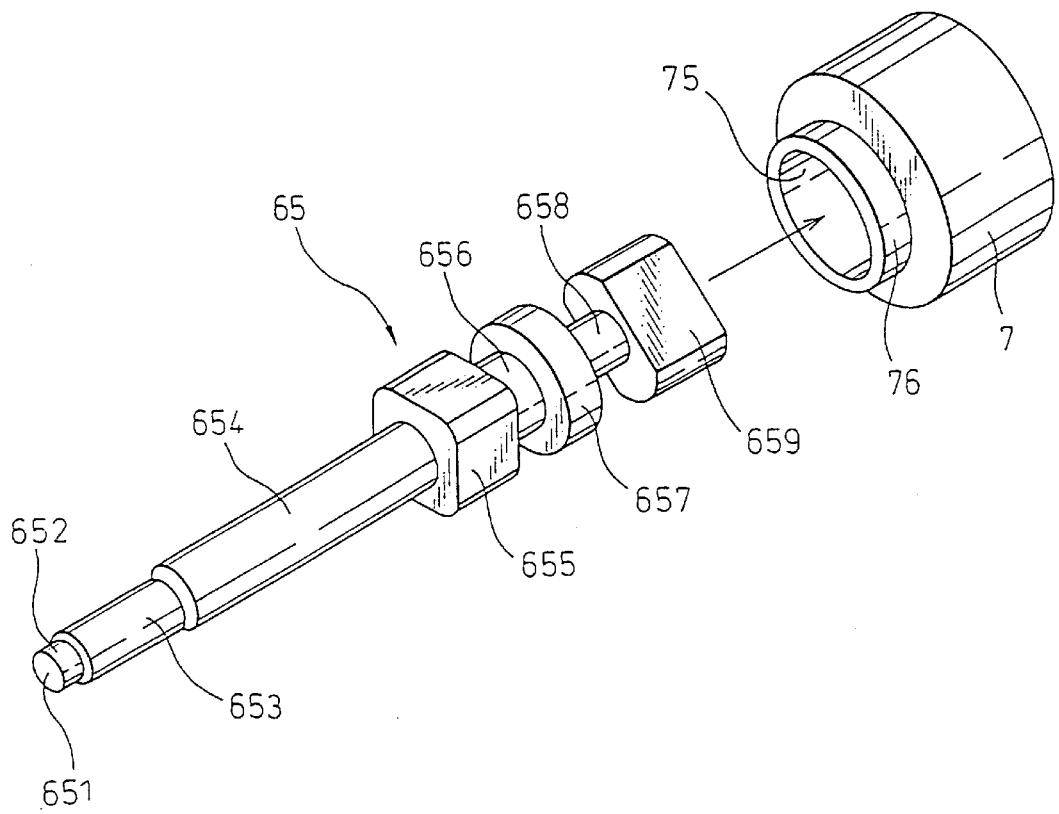
FIG. 13 is a view illustrating a needle valve and a moving core in the fuel injection valve according to Example 4.

Referring next to FIG. 13, the moving core 7 and the needle valve 65 are laser-welded together with their junction drum portion 76 and the junction end 659 being engaged with each other. In this Example, a ferrite type stainless steel is used as the needle valve 65 and a martensite type stainless steel is used as the moving core 7.

As shown in FIGS. 12 and 13, the moving core 7 has the cylindrical junction drum portion 76 with an inner hole 75. The moving core 7 has a recessed portion 78 (FIG. 12) in the upper surface thereof for receiving a spring 54 and has a through hole 79 in the center thereof for permitting the fuel to pass through.

The needle valve 65 has the junction end 659 that can be inserted in the inner hole 75 of the junction drum portion 76. The junction end 659 has a sectional shape (see FIG. 14) obtained by cutting upper and lower parts of a circle. The needle valve 65 includes a first shaft portion 652 having the contact portion 651, a second shaft portion 653 having a different diameter and a third shaft portion 654, which are continuously formed, and further has a slide portion 655 that slides in the inner hole 605 of the valve body 6. The slide portion 655 has a shape obtained by cutting four sides of a circle. On the upper side of the slide portion 655 are provided a fourth shaft portion 656, a stopper portion 657 of a large diameter, and the junction end 659 via a fifth shaft portion 658.

Figure 14:
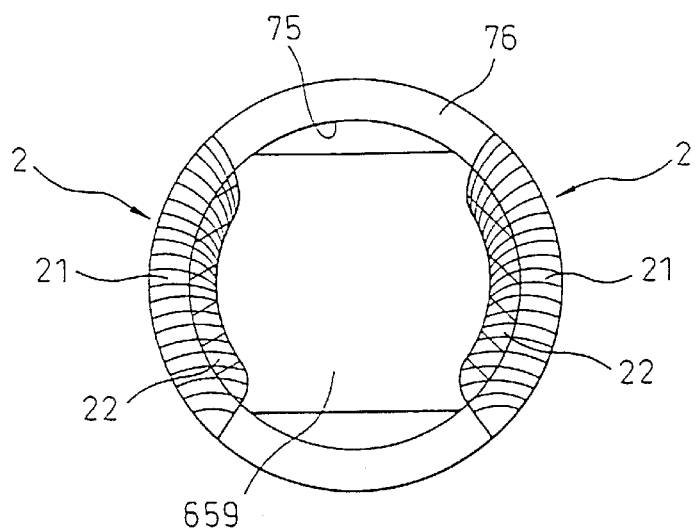
FIG. 14 is a sectional view along the line B—B of FIG. 12 and illustrates the welded structure according to Example 4.

Referring to FIG. 14, these two parts are joined together by forming a melt-solidified portion 2 by irradiating the surface of the junction drum portion 76 with a laser beam from the outer side in a state where the junction end 659 of the needle valve 65 is inserted in the inner hole 75 of the junction drum portion 76 of the moving core 7. As shown, furthermore, the melt-solidifying portions 2 are formed at two places where the junction drum portion 76 and the junction end 659 are in contact with each other (arcuate portions of the junction end 659).

The laser-welding conditions are the same as those of Example 1.

As shown in FIGS. 6A and 6B, the obtained melt-solidified portions 2 possessed the structure same as that of the case of Example 1.

The junction portions between the needle valve 65 and the moving core 7 possessed a sound structure without such defect as crack. Accordingly, the welded portions between the needle valve 65 and the moving core 7 exhibited markedly improved durability, contributing to improve the durability of the fuel injection valve as a whole.

What is claimed is:

1. A laser-welded structure of metal members, comprising:

a first member and a second member of metal materials of different kinds which are overlapped one upon the other, and a melt-solidified portion formed by the irradiation with a laser beam and arriving at said second member from the surface of said first member penetrating through said first member; wherein said melt-solidified portion has nearly an inverted triangular shape in cross section with its width becoming gradually narrow from the surface of said first member toward the inside thereof, and has a low-hardness layer on the front surface side of said melt-solidified portion and a high-hardness layer on the inside thereof; and said high-hardness layer has a structure in which first layers and second layers having a hardness smaller than that of said first layers are alternatingly laminated in a direction in which the welding proceeds.

2. A laser-welded structure of metal members according to claim 1, wherein said second member has a resistance against welding cracks smaller than that of said first member.

3. A laser-welded structure of metal members according to claim 1, wherein said first member is a ferrite stainless steel or a low-carbon steel and said second member is a martensite stainless steel or a high-carbon steel.

4. A laser-welded structure of metal members according to claim 1, wherein said melt-solidified portion has a depth which is from 1.1 to 2.2 times as great as the thickness of said first member.

5. A method of laser-welding metal members by overlapping a first member and a second member of metal materials of different kinds upon the other, and irradiating the surface of said first member with pulses of a laser beam to form a melt-solidified portion;

wherein said laser beam is so projected that said first member and said second member are melted by the laser beam of a first pulse to thereby form a first molten portion, projection of the laser beam of a second pulse is started before the growth of solidification of said first molten portion reaches the distance of motion of the laser beam axis thereby to form a second molten portion in a manner that it partly overlaps said first molten portion and, then, the third and subsequent pulses of the laser beam are successively projected being turned on and off maintaining a predetermined interval, in order to form a melt-solidified portion having a low-hardness layer formed on the front surface side and a high-hardness layer on the inside, the high-hardness layer being formed by alternatingly laminating first layers and second layers having a hardness smaller than that of said first layers in a direction in which the welding proceeds.

6. A method of laser-welding metal members according to claim 5, wherein the pulse frequency of said laser beam is not lower than 100 Hz.

7. A method of laser-welding metal members according to claim 5, wherein said pulses of the laser beam has a pulse-on duty as expressed by $(T_{ON}/(T_{ON}+T_{OFF}))\times 100$ of from 30 to 70%, wherein $T_{ON}$ is the on time in which the laser beam is continuously emitted, and $T_{OFF}$ is the off time in which no laser beam is emitted.

8. A method of laser-welding metal members according to claim 5, wherein said laser beam is so projected that the rate of welding the junction interface between the first member and the second member is not smaller than 5 mm/second.

9. A method of laser-welding metal members according to claim 5, wherein said laser beam is so projected that the depth of the molten portion is from 1.1 to 2.2 times as great as the thickness of said first member.

10. A method of laser-welding metal members according to claim 5, wherein said molten portion is periodically and stepwisely solidified in synchronism with the pulse period of said laser beam, and the length of solidification after each period is not larger than 100 μm in the direction in which the laser beam proceeds.

11. A method of laser-welding metal members according to claim 5, wherein the distance which the laser beam moves within a pulse interval is not larger than one-fifth the width of the junction interface of the molten portion.

12. A method of laser-welding metal members according to claim 5, wherein an average output of the laser beam pulses is lowered in the form of a slope or stepwisely, so that the depth of melt in the molten portion lies within a predetermined range of depth.

13. A method of laser-welding metal members according to claim 5, wherein the projection of the laser beam is terminated at the end of the welding after the average output of the laser beam is lowered in the form of a slope.

14. A fuel-injection valve for internal combustion engines, comprising a fixed core having a fuel-supply passage for supplying fuel, a housing surrounding said fixed core, a valve body having an injection port formed at an end of said housing and for injecting the fuel, a needle valve provided in said valve body and moves back and forth to open and close said injection port, and a moving core joined to said needle valve and moves back and forth in said housing based on an electromagnetic force, wherein said needle valve and said moving core are joined together relying on the method of laser-welding metal members according to claim 5.

15. A fuel-injection valve for internal combustion engines according to claim 14, wherein said moving core has a cylindrical junction drum portion with an inner hole while said needle valve has a junction end that can be inserted in the inner hole of said junction drum portion, and these two members form a melt-solidified portion with the surface of the junction drum portion being projected with a laser beam from the external side in a state where said junction end is being inserted in the inner hole of said junction drum portion.

* * * * *